(12) United States Patent
Reed et al.

(10) Patent No.: US 11,599,926 B2
(45) Date of Patent: *Mar. 7, 2023

(54) PRODUCT DRIVEN APPROACH TO TECHNOLOGY PROVISIONING, OPERATIONS, AND BILLING

(71) Applicant: Goldman Sachs & Co. LLC, New York, NY (US)

(72) Inventors: Carl J. Reed, Tenafly, NJ (US); Charles Klein, Austin, TX (US)

(73) Assignee: Goldman Sachs & Co. LLC, New York, NY (US)

( * ) Notice: Subject to any disclaimer, the term of this patent is extended or adjusted under 35 U.S.C. 154(b) by 424 days.

This patent is subject to a terminal disclaimer.

(21) Appl. No.: 16/853,166

(22) Filed: Apr. 20, 2020

(65) Prior Publication Data
US 2020/0250723 A1   Aug. 6, 2020

Related U.S. Application Data

(63) Continuation of application No. 13/909,873, filed on Jun. 4, 2013, now Pat. No. 10,748,197.
(Continued)

(51) Int. Cl.
*G06Q 30/06* (2012.01)
*G06Q 30/0601* (2023.01)
*G06Q 30/04* (2012.01)

(52) U.S. Cl.
CPC ......... *G06Q 30/0621* (2013.01); *G06Q 30/04* (2013.01)

(58) Field of Classification Search
None
See application file for complete search history.

(56) References Cited

U.S. PATENT DOCUMENTS 5,132,920 A    7/1992 Bellows et al.
7,403,917 B1   7/2008 Larsen
(Continued)

FOREIGN PATENT DOCUMENTS

WO    2002033626 A1    4/2002

OTHER PUBLICATIONS

J. Gergic, "Towards a versioning model for component-based software assembly," International Conference on Software Maintenance, 2003. ICSM 2003. Proceedings., 2003, pp. 138-147, doi: 10.1109/ICSM.2003.1235415 (Year: 2003).*
(Continued)

*Primary Examiner* — Michelle T Kringen

(57) ABSTRACT

Systems and methods for a product driven approach to technology provisioning, operations, and billing are provided. Some embodiments provide an Information Technology (IT) business architecture built around the product driven methodology. This architecture can be designed to optimize the demand side provisioning of technology products to meet business intent and the execution of supply side assembly and implementation lifecycle. A technology model can be used that recursively decomposes services and products into various components. As a result, the technology model allows for effective and efficient provisioning, pricing, and impact assessment of the organization's technology to thereby drive the efficiency of scale and the automation of the provisioning, the finance, and the operation businesses. Moreover, by representing everything in technologies and products, including people, within the technology model, then determining the cost of the product and tracking usage provides an effective consumption-based Bill of IT.

20 Claims, 14 Drawing Sheets

Related U.S. Application Data

(60) Provisional application No. 61/655,399, filed on Jun. 4, 2012.

(56) References Cited

U.S. PATENT DOCUMENTS

| | | | |
|---|---|---|---|
| 7,702,544 B2 | 4/2010 | Gerber et al. | |
| 7,895,091 B2 | 2/2011 | Hegemier et al. | |
| 7,933,746 B2 | 4/2011 | Kennedy et al. | |
| 8,078,489 B1 * | 12/2011 | Marsten | G06Q 10/04 |
| | | | 705/7.25 |
| 8,099,272 B2 | 1/2012 | Conway | |
| 8,099,320 B2 | 1/2012 | Li et al. | |
| 8,121,959 B2 | 2/2012 | Delvat | |
| 8,165,952 B2 | 4/2012 | Burrell et al. | |
| 10,748,197 B2 * | 8/2020 | Reed | G06Q 30/04 |
| 2006/0111963 A1 | 5/2006 | Li et al. | |
| 2006/0155768 A1 | 7/2006 | Weil et al. | |
| 2006/0253479 A1 | 11/2006 | Kennedy et al. | |
| 2007/0226122 A1 * | 9/2007 | Burrell | G06Q 40/025 |
| | | | 705/37 |
| 2007/0288929 A1 | 12/2007 | Bassin et al. | |
| 2008/0120617 A1 | 5/2008 | Keller et al. | |
| 2008/0154750 A1 | 6/2008 | Hegemier et al. | |
| 2008/0168459 A1 | 7/2008 | Benedetti et al. | |
| 2009/0228867 A1 | 9/2009 | Bandyopadhyay et al. | |
| 2010/0005451 A1 * | 1/2010 | Hirose | G06F 8/71 |
| | | | 717/121 |
| 2011/0119202 A1 | 5/2011 | Williams et al. | |
| 2011/0213633 A1 | 9/2011 | Delvat | |
| 2011/0270866 A1 * | 11/2011 | Dettinger | G06Q 10/067 |
| | | | 707/769 |
| 2013/0325650 A1 | 12/2013 | Reed et al. | |

OTHER PUBLICATIONS

Lee et al., "Integrated synthesis of assembly and fixture scheme for properly constrained assembly," IEEE Transactions on Automation Science and Engineering 2.3, 2005, pp. 250-261.

Decision to Refuse a European Patent Application dated Feb. 12, 2019 in connection with European Patent Application No. 13 800 663.0, 20 pages.

International Search Report and Written Opinion in connection with PCT Patent Application No. PCT/US13/44154 dated Nov. 1, 2013, 13 pages.

* cited by examiner

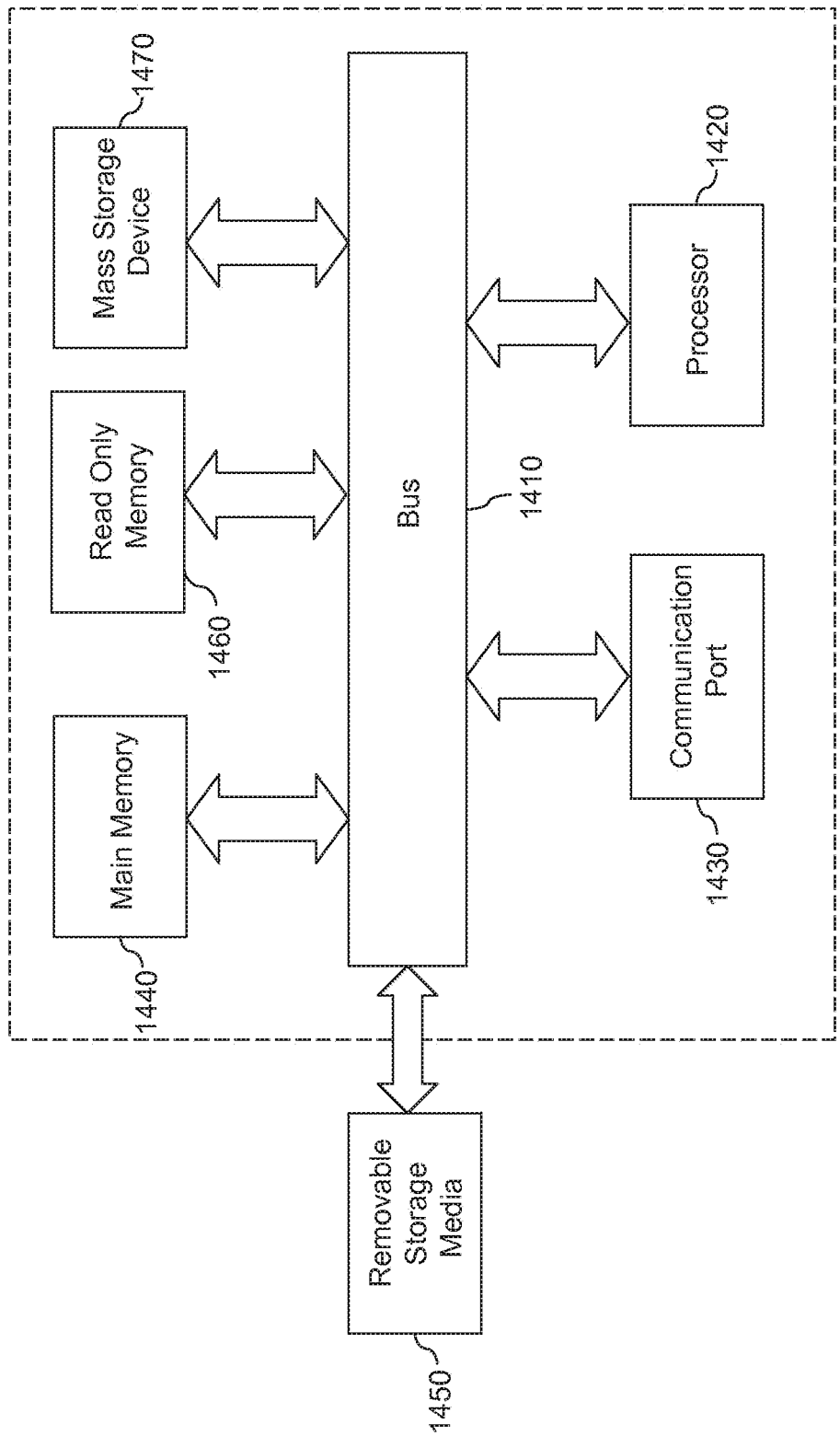

PRODUCT DRIVEN APPROACH TO TECHNOLOGY PROVISIONING, OPERATIONS, AND BILLING

CROSS-REFERENCE TO RELATED APPLICATIONS

This application is a continuation of U.S. patent application Ser. No. 13/909,873 filed on Jun. 4, 2013, which claims priority to U.S. Provisional Application Ser. No. 61/655,399 filed on Jun. 4, 2012, which are incorporated herein by reference in their entirety for all purposes.

TECHNICAL FIELD

Various embodiments of the technology of the present application generally relate to technology management. More specifically, some embodiments relate to systems and methods that provide a product driven approach to technology provisioning, operations, and billing.

BACKGROUND

Businesses and other enterprises often use a variety of electronic devices such as computers, databases, data storage devices, communications devices, telecommunications equipment, and/or mobile devices. These electronic devices can be used to create, manipulate, store, and/or transmit data. These applications of electronic devices are often referred to as Information Technology (IT). In order to effectively manage the large number of IT applications and devices, many large enterprises have a team of personnel dedicated to network administration, software development, software maintenance, software installation, hardware deployment, hardware maintenance, and other services.

As the demands for the use of various technologies evolve, there have been increasing burdens placed on the support and management of these systems. Moreover, the ongoing evolution of IT as a recognized business differentiator has been a major factor in driving ever increasing industry investment and innovation. Further, the evolution of IT has made it difficult for the end users or consumers of the technology to keep abreast of technological advancements. The resulting diversity of technology solutions combined with increasing demand from technology users has produced an unprecedented pressure on the enterprise to manage its technology assets and services as a core business. Like any other business, IT needs to provide its "clients" with the "products" and "services" they demand with agility, cost transparency, efficiency, and abstraction from technical complexity.

SUMMARY

Systems and methods are described for technology management within an organization. More specifically, some embodiments relate to systems and methods that provide a product driven approach to technology provisioning, operations, and billing. Various embodiments allow for execution of provisioning, operations, and finances off of a common multi-dimensional product catalog. In some embodiments, a computer-implemented method allows a user to specify a set of features and functional requirements. By accessing a recursive model stored in memory, the set of features and functional requirements can be matched to a provisionable assembly that satisfies the set of features and functional requirements. Once a provisionable assembly has been identified, a set of constituent components (e.g., subassemblies, physical components, or service components) to create the provisionable assembly can be determined based on the recursive model. Then, a request to provision a product based on the set of constituent components can be generated.

Some embodiments provide ways to decompose a set of products each having functional descriptions by representing the functional descriptions with selectable features and functional requirements. The selectable features and functional requirements can then be mapped into constituent components (e.g., by using data modelers). The recursive model can then be created based on the set of constituent components for the set of products. As the functional descriptions and available constituent components change over time, the recursive model can be updated. In some cases, a second request to reprovision the product based on the recursive model updated with the new constituent components may be generated.

Embodiments of the present technology also include computer-readable storage media containing sets of instructions to cause one or more processors to perform the methods, variations of the methods, and other operations described herein.

Various embodiments can include a processor, a memory, a communications module, an inference engine, a fulfillment module, a monitoring module, an update module, an implication module, an impact module, an inventory module, an operational module, a finance module, and/or a graphical user interface generation module. The memory store can have stored thereon a multi-dimensional model that recursively maps products into a set of constituent components (e.g., services, raw materials, software, hardware, subassemblies, or personnel resources). The communications module can be configured to receive an orderable specifying a set of features and functional requirements set forth by a requestor.

The inference engine can be configured to use the processor to access the multi-dimensional model stored in memory. In some embodiments, the inference engine can navigate the multi-dimensional model to generate a provisionable assembly of constituent components that satisfies the set of features and functional requirements. The fulfillment module can be configured to receive the provisional assembly of constituent components and generate, using the processor, a fulfillment request to build a product. The monitoring module can be configured to monitor the use of the product and create a usage profile. The update module can be configured to determine if an alternative provisional assembly of constituent components would satisfy the historical usage profile.

The implication module can be configured to predict an impact that the fulfillment request will have on available physical inventory and logical inventory. The impact module can be configured to predict an impact for maintenance of the product or failure in one or more of the constituent components. The inventory module can be configured to manage physical inventory and logical inventory. The operational module can be configured to prioritize the use of physical inventory and logical inventory in the context of a scheduled or unscheduled event. The finance module can be configured to determine a cost structure for the product. The graphical user interface generation module can be configured to generate a graphical user interface that allows a user to create the orderable. In some embodiments, a data modeler can be configured to create the multi-dimensional model by recursively decomposing available products in constituent components. An optimizer, accessible by the inference engine, can be used to minimize the total cost of the provisional assembly of constituent components.

While multiple embodiments are disclosed, still other embodiments of the technology of the present application will become apparent to those skilled in the art from the following detailed description, which shows and describes illustrative embodiments of the technology. As will be realized, the technology is capable of modifications in various aspects, all without departing from the scope of the present technology. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which:

FIG. 14 illustrates an example of a computer system with which some embodiments of the present technology may be utilized.

Figure 1:
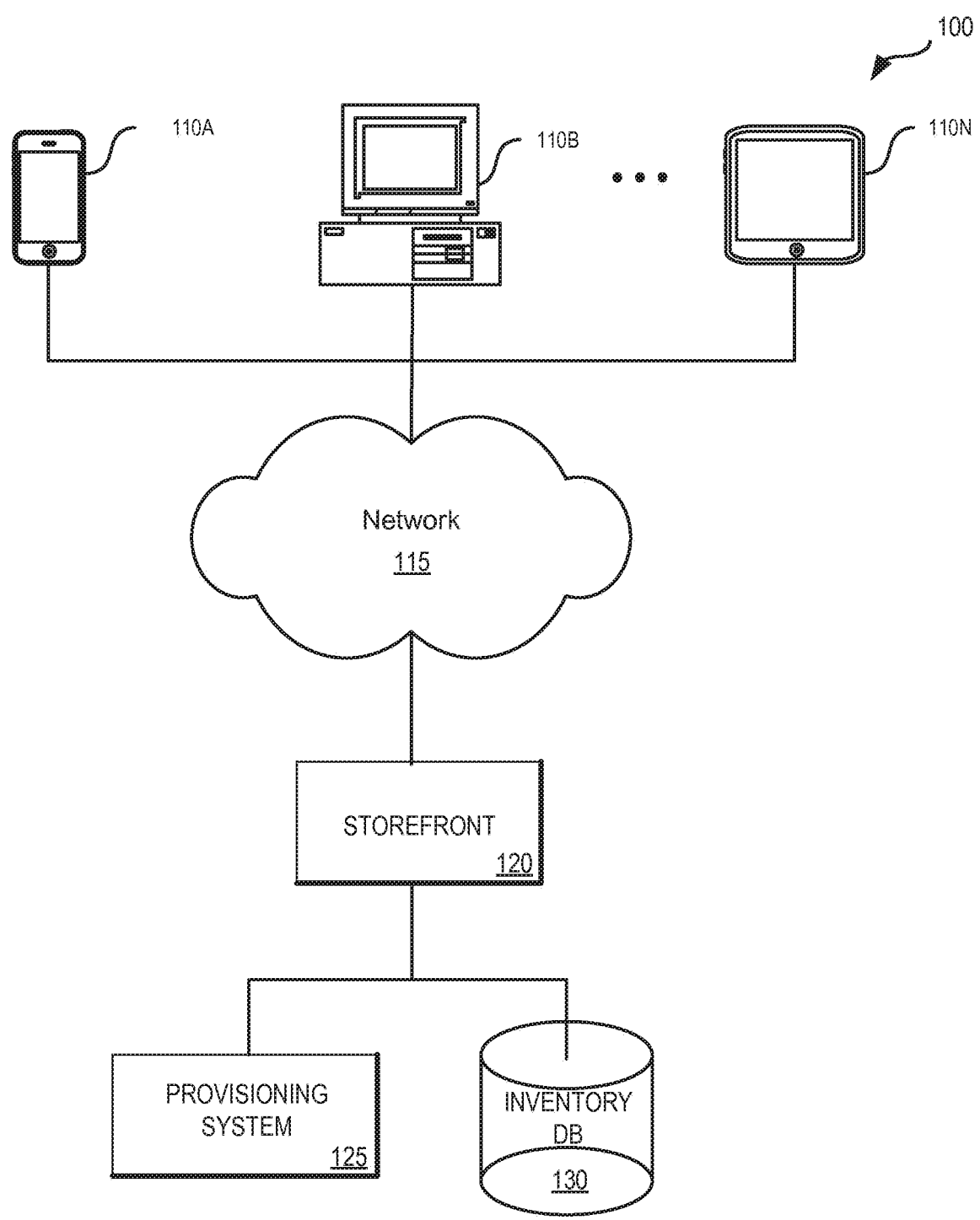
FIG. 1 illustrates an example of an environment in which some embodiments may be utilized.

The drawings have not necessarily been drawn to scale. For example, the dimensions of some of the elements in the figures may be expanded or reduced to help improve the understanding of the embodiments of the present technology. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to technology management within an organization. More specifically, some embodiments relate to systems and methods that provide a product driven approach to technology provisioning, operations, and billing. Some embodiments provide an Information Technology (IT) business architecture built around the product driven methodology. This architecture can be designed to optimize the demand side provisioning of technology products to meet business intent and the execution of supply side assembly and implementation lifecycle. A technology model can be used that recursively decomposes services and products into various components. As a result, the technology model allows for effective and efficient provisioning, pricing, and impact assessment of the organization's technology to thereby drive the efficiency of scale and the automation of the provisioning, the finance, and the operation businesses. Moreover, by representing everything in technologies and products, including people, within the technology model, then determining the cost of the product and tracking usage provides an effective consumption-based Bill of IT. Moreover, various embodiments provide for systems and techniques to manage the return of products and/or the repair of failing products.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to a product driven approach to technology management, embodiments of the present technology are equally applicable to various other applications outside of technology management. For example, embodiments of the present application are applicable to manufacturing environments, distribution centers, LEED design, and many others.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a non-transitory machine-readable medium having stored thereon instructions that may be used to program a computer (or other electronic devices) to perform a process. The machine-readable medium may include, but is not limited to, optical discs, compact disc read-only memories (CD-ROMs), magneto-optical discs, ROMs, random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

General Description

FIG. 1 illustrates an example of a network-based system 100 in which some embodiments may be utilized. As illustrated in FIG. 1, user devices 110A-110N can use network 115 to access storefront 120. Through storefront 120, users can search for technology products (e.g., applications, services, hardware, devices, etc.) provided by an enterprise's IT department. In accordance with various embodiments, user devices 110A-110N may use network 115 to submit and retrieve information regarding the technology products and system configurations that are supported by the enterprise. User devices 110A-110N can interact with storefront 120 through an application programming interface (API) that runs on the native operating system of the device, such as IOS® or ANDROID™.

User devices 110A-110N can be any computing device capable of receiving user input as well as transmitting and/or receiving data via the network 115. In one embodiment, user devices 110A-110N can be any device having computer functionality, such as a personal digital assistant (PDA), mobile telephone, smartphone, tablet, or similar device. User devices 110A-110N can be configured to communicate via network 115, which may comprise any combination of local area and/or wide area networks, using both wired and wireless communication systems. In one embodiment, network 115 uses standard communications technologies and/or protocols. Thus, network 115 may include links using technologies such as Ethernet, 802.11, worldwide interoperability for microwave access (WiMAX), 3G, 4G, CDMA, Long Term Evolution (LTE), digital subscriber line (DSL), etc.

Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). Data exchanged over network 115 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Storefront 120 may allow a user to navigate or specify a set of features and functional requirements for the desired technology. In some embodiments, storefront 120 can use one or more graphical user interfaces to present a product catalog, search results, and navigational options. The client can navigate the product catalog based on selectable features and functional requirements identified by the recursive model of the enterprise technology. In accordance with various embodiments, the product catalog can provide persistent storage of products according to a model that captures the three core product-type distinctions (i.e., orderables, provisionables, and procurables). Using this information, provisioning system 125 can request that a product be built from inventory identified in inventory database 130 or ordered from vendors.

Procurable products are typically procured from a variety of vendors. These different vendors may provide contrary definitions of basic and critically-important terms (e.g., power ratings or product dimensions) describing the procurable product. The product catalog can provide a semantically normalized model for these products and their attributes. The normalized model provides one technique for understanding the various differences in meanings that vendors ascribe to the same descriptive terms, and appropriately adjust for these differences in the execution of client queries. Not all enterprise relevant procurable product data has to be authoritatively stored within the catalog, but the product data may be accessible via the catalog in some cases. For example, a catalog could supply a price either directly or indirectly via an ecommerce reference during product procurement. In other cases, the catalog may access or query third-party systems to determine the most current information.

The catalog implementation may be capable of representing, and inferring, the structural and behavioral aspects of a provisionable product and the recursive nature of provisionable product's assembly and subassemblies. For example, the system may be able to perform one or more of the following: 1) infer the behavior of an assembly based on its composition of subassemblies; 2) generalize that each element of a disjointed product decomposition can have a cumulative property; and/or 3) support a query capability that can match the divergent perspectives of a product's functional intent on the one hand and its composition and technical behavior on the other. The catalog's representation of a provisionable product also may accommodate the appropriate assembly and fulfillment instruction sets required by the provisioning fulfillment function to create the provisionable product required to satisfy a particular client order.

For the core product types (i.e., orderables, provisionables, and procurables), the catalog may support human and application retrieval interfaces employing all useful search modalities. This can include, for example, free-text based queries as well as dimensional selection of attribute values/ranges, and/or a combination of both or other available modalities. For example, in searching for orderable products, a human client may be able to query via a string entry like "mobile computing device" in an unconstrained field, while also limiting the results to ones that match structured field entries of length and depth constraints.

Some embodiments of the product catalog provide for a logical inference capability that cuts across each of the orderable, provisionable, and procurable product types. For example, a client may be able to execute the following orderable search: "mobile computing device." Upon receiving the orderable search, the system can match to the concept of an enterprise configured blackberry as a provisionable type of mobile computing device. This type of matching can occur even if there is no directly modeled relationship between an enterprise configured BlackBerry and mobile computing device.

In various implementations of a product catalog, there may be a chain of many, successively more general concepts, which connect the enterprise configured BlackBerry to mobile computing device via types of linkages. For each link, the product catalog's inference engine may be able infer that the type of the latter is a type of the former. In many cases, the reduced model resulting from not requiring the product modeler to add all the "type of" links between a newly entered product and every concept of which that product is a type may be worth the increased complexity of the inference engine and/or associated rules. The combination of modeling only the most specific such linkages, together with the fact that "type of" is a logically transitive relationship, is generally sufficient for the catalog's query engine to infer all valid cases of type relationships.

As another example, consider a client orderable search for "devices that can run Excel Mobile." This search could match to the (hypothetical) provisionable "enterprise configured Nokia Lumia 900" based on the following logic: 1) the procurable, on which this provisionable is based, has Windows Phone 7 as its factory installed OS; 2) the Office Mobile program is designed to run on the Windows Phone 7 OS; and 3) the Excel Mobile program is a subprogram of the Office Mobile program. The generalizations, or rules, that would enable this inference, based on the facts above, could include the following:

R1: If an OS is factory-installed on a device, then the device is able to run that OS.
R2: If a device is able to run a certain OS, then the device is able to run any program that runs on that OS.
R3: If a device is able to run a certain program, then it is also able to run any subprograms of that program.

Thus, the product model may be able to represent rules R1 through R3 and be inferentially effective in resolving the client's query to an enterprise configured Nokia Lumia 900, and any other provisionable that runs the Windows Phone 7 OS.

In accordance with various embodiments, the content of the catalog may be enterable and retrievable as a formal data model authored in a formalized modeling language. The catalog product model may be the only authoritative model for all dimensions of product structure and behavior. As a result, the modeling formalism may provide adequate expressive power to capture all of the following content types: 1) classificatory relationships (e.g., mobile computing device is an orderable product); 2) product concepts, and concepts and attributes needed to fundamentally characterize each product; and 3) compositional and structural relationships (e.g., for a provisionable unit of network hardware, its provisionable and procurable subassemblies, and the types of interconnections between them).

Interconnections between concepts can be used to connect expressions of client intent to catalog content (e.g., the generalizations from which the system can infer what provisionables match to what specifications of client intent). Unified Modeling Language (UML) is a popular formalism for modeling structures of basic concepts and relationships. However, UML only provides the expressivity to model a product concept graph of "type of" (subclass) relationships and the most basic definitions of the attributes and relationships. A formal representation of Rule R1 such as (factoryInstalledOS SYS OS) always implies (canRunOS SYS OS) cannot be formally represented by a UML style model (likewise for R2 and R3). This limitation also extends to entity-relationship style models that are arguably less expressive than UML. While rules like R1 can be programmatically implemented and applied to a model, they cannot be formally represented and maintained as an explicit part of the model.

The most effective modeling formalisms with available implementation platforms are ontology languages. These include the weakly expressive web-tagging oriented languages RDF and RDFS, the more powerful OWL family of languages, and also the Common Logic (CL) class of languages, of which two varieties have full implementations in integrated knowledge store and query and inference engines. CL has a broad range of features that allow product modelers to express all of the key types of catalog model detail. These features can include the following: 1) the full expressive power of first order logic, simplistically a logic in which everything is an individual; 2) part of the expressive power of second order logic, simplistically a logic that supports generalizations and rules that describe concepts and relationships; and 3) a sublanguage scoped to the process of virtual integration of external content such as relational data.

First order logic enables product modelers to craft relatively compact formulations of domain rules like R1-R3 above—these would look something like the following:

| "If a program runs under a certain OS, and a certain system can run that OS, then that system can run that program." | "If a program runs under a certain OS, then so do its subprograms." |
|---|---|
| (implies<br>  (and<br>    (runsUnderOS ?PROG ?OS)<br>    (runsOS ?SYS ?OS))<br>  (runsProgram ?SYS ?PROG)) | (implies<br>  (and<br>    (runsUnderOS ?SUPER ?OS)<br>    (subPrograms ?SUPER ?SUB))<br>  (runsUnderOS ?SUB ?OS)) |
| "If an OS is factory-installed for a product, then that product can run that OS." | |
| (subProperty factoryInstalledOS runsOS) | |

NOTE:
? denotes a variable as an input to a predicate.

CL is the only type of implemented modeling language that offers a substantial degree of second order logical expressive power. Second order expressions allow the system to state rules about all classes, or all relationships, of a certain type. A simple and powerful example is this CL definition of TransitiveBinaryPredicate. This concept is defined with the following second order rule:

```
(implies
    (and
        (isa ?PRED TransitiveBinaryPredicate)
        (?PRED ?X ?Y)
        (?PRED ?Y ?Z))
    (?PRED ?X ?Z))
```

Thus, if a modeler wishes to introduce a new transitive relationship to the model, such as functionalParts, the modeler only needs to add the following assertion to the model, in order to get the correct behavior from the inference engine in queries requiring deductions with this predicate: (isa functionalParts TransitiveBinaryPredicate). For example, consider a structurally complex provisionable product: it has a wide fan-out of sequences of provisionable subassemblies that terminate in thirty different procurable components. This product could be modeled as a tree (see, e.g., FIG. 4), with each component related to its children via functionalParts. The fact that the functionalParts is known by the inference engine to be a transitive relationship radically simplifies common queries for the provisioning team like: "What are the procurable functional parts of ProdX?" This simple CL query could be mapped to an equally compact action/expression in a dedicated client GUI. The transitive feature of functionalParts, via the defining rule on TransitiveBinaryPredicate, enables the inference engine to perform what would otherwise require an externally implemented process to execute (i.e., recursively traversing the long, branching sequences of functionalParts relationships until the terminal procurable nodes are resolved).

The sublanguage enables modelers to specify how to translate from the contents of a relational database into expressions in the CL language. Once the transformation assertions are made in the CL knowledge base code, modules can be generated to formulate the appropriate SQL queries to retrieve data. This data can then be translated into CL and incorporated in inference to answer queries against the model. This method of information integration is appropriate for acquiring data that needs to be authoritatively sourced from knowledge stores external to the catalog. For example, all data about procurables is authoritatively derived from external vendor catalogs. Procurable product data that is sufficiently static can be asserted directly in the catalog; whereas potentially more volatile data, such as price, could be a virtual part of the catalog's content leveraging this type of functionality.

Figure 2:
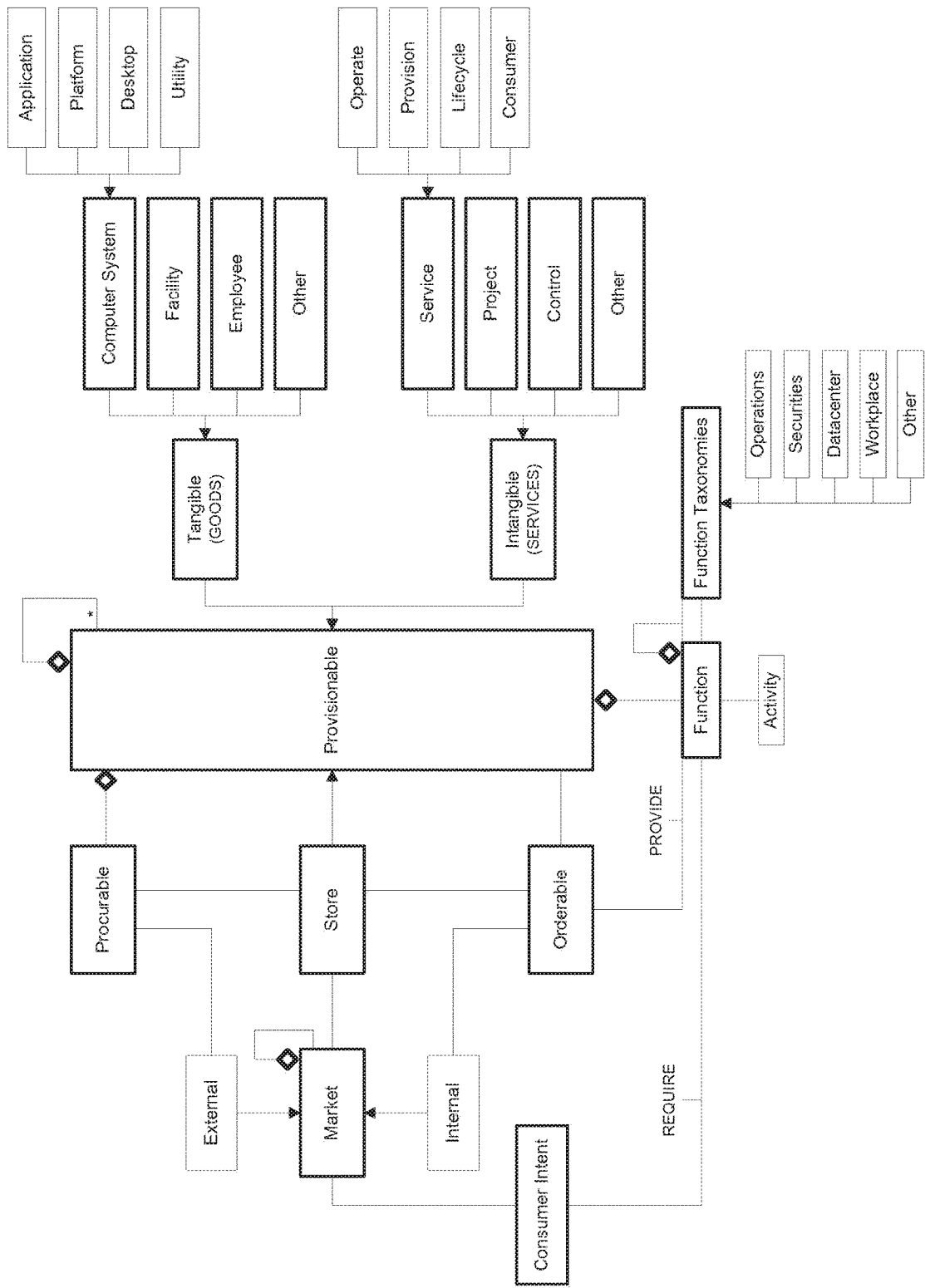
FIG. 2 is a block diagram illustrating a product meta model leveraging a Unified Modeling Language (UML) style in accordance with various embodiments of the present technology.

FIG. 2 is a block diagram illustrating a product meta model leveraging a UML style in accordance with various embodiments of the present invention. A consumer can enter or select product requirements and/or functions at a marketplace which can include procurable products and orderable products. In some embodiments, the consumer can enter the product requirement and/or functions through natural language text entries. Upon receiving the natural language text entries, the marketplace can determine the consumer intent (e.g., using the defined ontology for the enterprise). The consumer intent can then be mapped to functions of provisionable products. Using this information, the marketplace can offer possible product solutions to the user.

The marketplace can include multiple different stores which provide different types of provisionable products made from procurable products and/or orderable products. The provisionable products can be a combination of tangibles (e.g., goods) and intangibles (e.g., services). The tangibles can be any physical resource such a computer systems, facilities, employees, and the like. Similarly, the intangibles can be services, projects, controls, and the like. Both the tangibles and intangibles can be recursively defined. For example, the computer system can include applications, platforms, desktop configurations, utilities, etc.

For example, LEED certification has set requirements for tangibles such as low-emitting materials (e.g., adhesives, sealants, paints, coatings, carpets, composite wood, agrifiber products, etc.) as wells as intangible items such as the services needed to build, manage, and track projects, certifications, controls, etc. Depending on the combination of materials and/or services, the different credits may be assigned. Other credits can be assigned for quantifying structural element in terms of cubic feet for building reuse (i.e., shell and non-shell components), resource reuse (e.g., by specifying salvaged/refurbished materials), recycled content, rapidly renewable materials, etc. There are many types of services, controls, and subprojects which can be defined through the use of various embodiments of the technology. As such, a user of the marketplace could easily understand the impact of selecting certain products to meet a desired certification level. In addition, if a particular product desired by the user was not available, the system can allow the user to quickly identify alternative products and understand the impact on the overall certification level.

Figure 3:
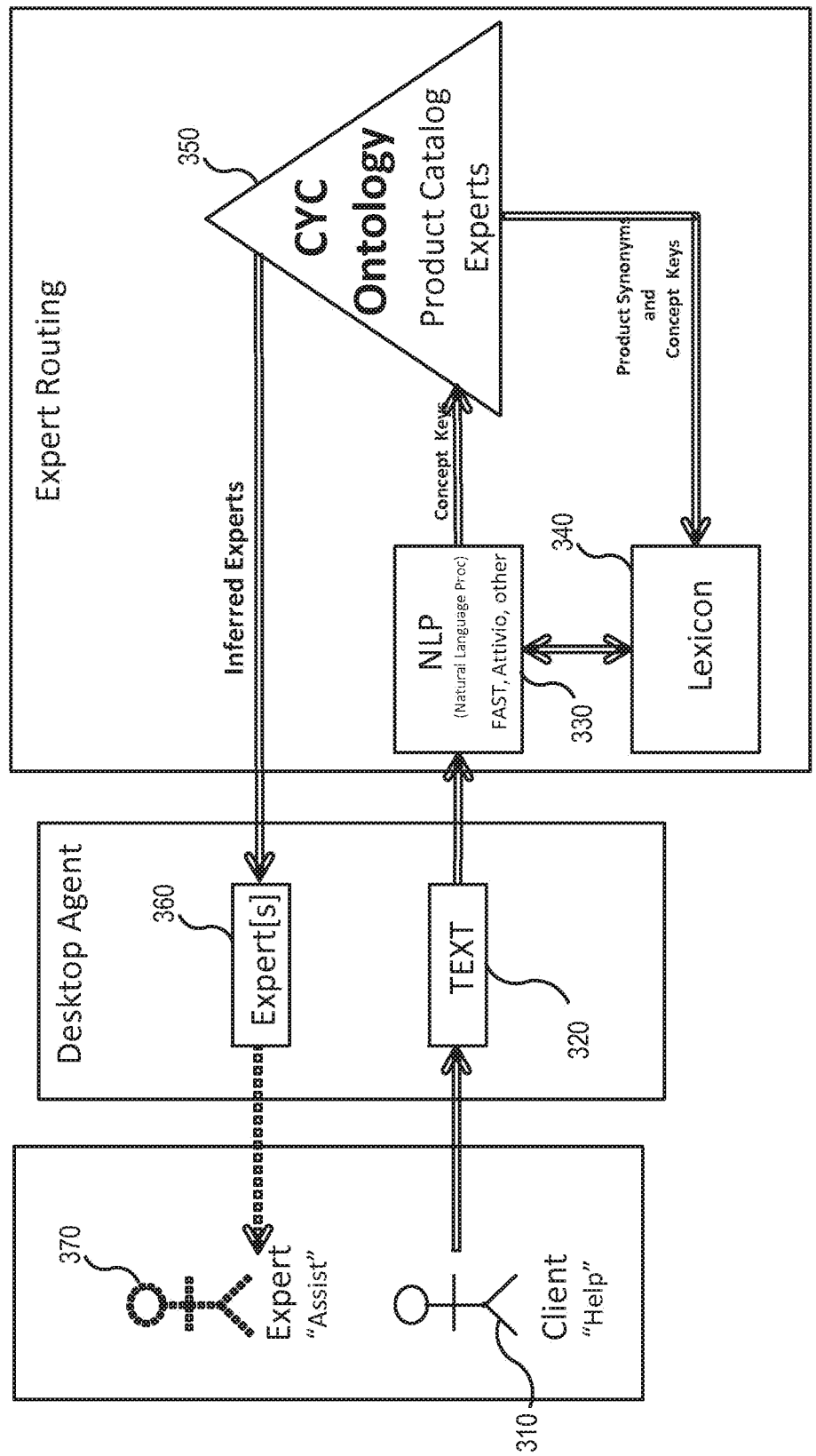
FIG. 3 is an example of a functional architecture illustrating expert routing in accordance with some embodiments of the present technology.

FIG. 3 is an example of a functional architecture illustrating expert routing in accordance with some embodiments of the present technology. A product driven decomposition of a question can be used to navigate to relevant knowledge sources. For example, suppose a client 310 can enter a text query 320 that states "can't share my screen." Using a natural language processor 330, a product lexicon 340, and the product ontology 350 can be used to determine experts 360. While an enterprise may not have experts that are explicitly associated with screen sharing, they would have experts 360 in MS Office Communicator that can help the client 310. The product ontology 350 knows that screen sharing is a primary function of MS Live Meeting Client, which is a subprogram of MS Office Communicator. By inferring the context of MSOfficeCommunicator:MSLiveMeetingClient, the system can now use this context to find relevant expertise. The system can then connect the client 310 to expert 370. In some cases, the relevant expertise could be a person or other documented sources of relevant knowledge.

The ontology used by various embodiments provides a logical representation of a specific domain (or sets of domains) such as products, social relationships, vulnerabilities, threats, etc. A formal semantic model can then be used to describe the structure and behavior. Consider the following examples of a taxonomy:

A is a type of B: Compute Farm is a type of Enterprise Platform.

A is composed of B: A Switch is composed of a Cisco Chassis.

R is a relationship between A and B: A Supervisory relationship is from person to person.

Consider the following examples of CL:

R is Transitive means R(A,B) and R(B,C) then R(A,C)

As a result, the system can deduce Calendar is Part of Office because Outlook is part of Office and Calendar is part of Outlook.

R1 transfers through R2 when R1(A,B) and R2(B,C) then R1(A,C).

As a result, the system can deduce supply transfers through component parts recursively.

Figure 4:
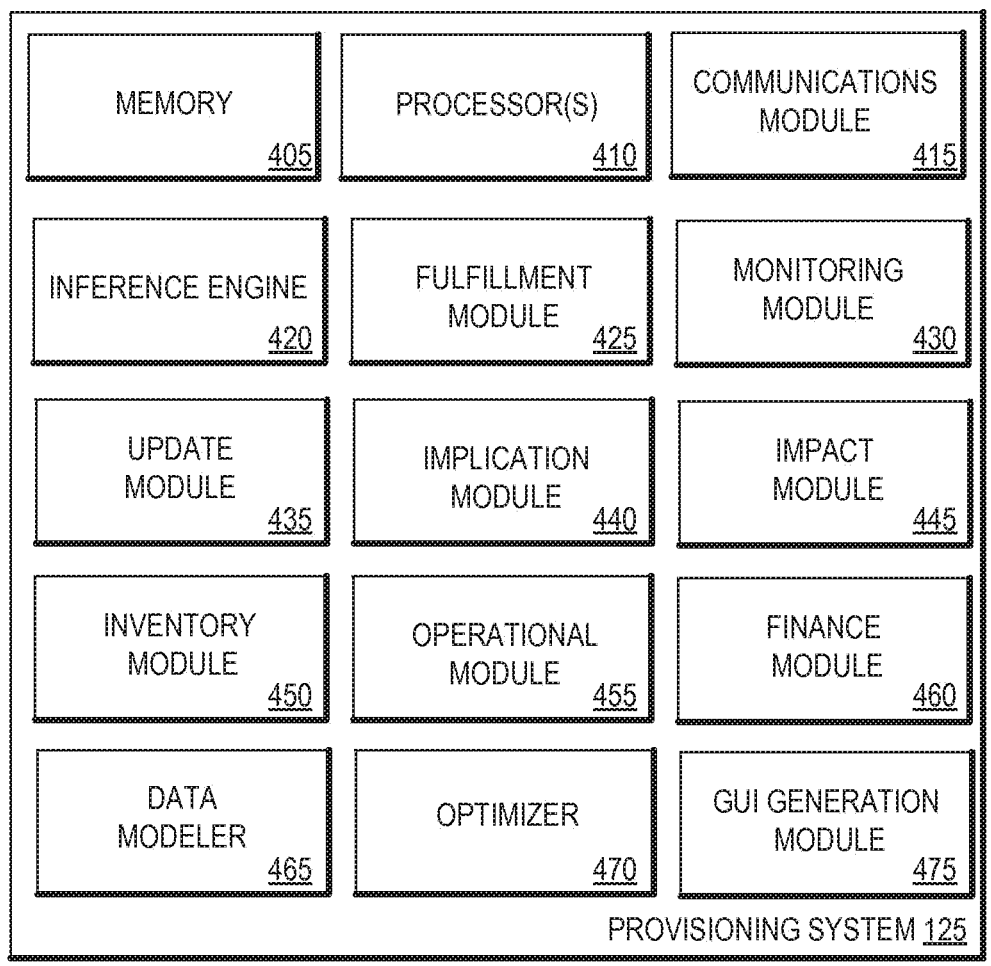
FIG. 4 is a block diagram of various components of a provisioning system that may be present in one or more embodiments of the present technology.

FIG. 4 is a block diagram of various components of provisioning system 125 that may be present in one or more embodiments of the present technology. According to the embodiments shown in FIG. 4, provisioning system 125 can include memory 405, one or more processors 410, communications module 415, inference engine 420, fulfillment module 425, monitoring module 430, update module 435, implication module 440, impact module 445, inventory module 450, operational module 455, finance module 460, data modeler 465, optimizer 470, and graphical user interface (GUI) generation module 475. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, implication module 440 and impact module 445 can be combined into a single module for predicting the impact of various actions or scenarios.

Memory 405 can be any device, mechanism, or populated data structure used for storing information. In accordance with some embodiments of the present technology, memory 405 can encompass any type of, but is not limited to, volatile memory, nonvolatile memory, and dynamic memory. For example, memory 405 can be random access memory, memory storage devices, optical memory devices, media magnetic media, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 405 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 405.

Memory 405 may be used to store instructions for running one or more applications or modules on processor(s) 410. For example, memory 405 could be used in one or more embodiments to house all or some of the instructions needed to execute the functionality of communications module 415, inference engine 420, fulfillment module 425, monitoring module 430, update module 435, implication module 440, impact module 445, inventory module 450, operational module 455, finance module 460, data modeler 465, optimizer 470, and/or GUI generation module 475.

Communications module 415 can be configured to manage and translate any requests from user device 110A-110N, system component, application, service, module, or graphical interface screen into a format required by the destination component, application, service, module, and/or system. Similarly, communications module 415 may be used to communicate between systems and/or modules that use different communication protocols, data formats, or messaging routines. For example, extensible markup language (XML), proprietary message formats, and/or other messaging formats may be used by components, applications, services, and/or systems. In some embodiments, communications module 415 can receive and transmit an orderable specifying a set of features and functional requirements set forth by a requester.

Inference engine 420 can access a multi-dimensional model stored in memory 405. Along with the multi-dimensional model, inference engine 420 may also have access to additional rules, logical relations, historical data, and/or algorithms for formulation conclusions. Inference engine 420 can navigate the multi-dimensional model to generate a provisionable assembly of constituent components (e.g., services, raw materials, software, hardware, and personnel resources) that satisfy a set of features and functional requirements specified by the requester. Fulfillment module 425 can receive the provisional assembly of constituent components and generate a fulfillment request to build a product from the provisionable assembly.

Once the product has been delivered, monitoring module 430 can monitor, or receive reports or notifications regarding, the use of the product. This information can be collected over a period of time (e.g., month, year, expected life of the product, etc.). In some cases, this information may be used to create a usage profile for the specific product, for a user, and/or for similar product types. The usage profile may include information regarding the use of other products. Still yet, in some cases, the usage information may be aggregated with usage information regarding other identical and/or similar products. Update module 435 can determine if an alternative product or provisional assembly of constituent components would satisfy the usage profile.

Implication module 440 can predict an impact that the fulfillment request will have on available physical inventory and logical inventory. Impact module 445 can predict an impact of maintenance of the product or failure in one or more of the constituent components. Implication module 440 and impact module 445 create messages regarding this impact. In some embodiments, inventory module 450 may receive these messages as inputs for an automated ordering system. Inventory module 450 can be used to manage the physical inventory and logical inventory. In some embodiments, inventory module 450 may use operational module 455 to prioritize the use of physical inventory and logical inventory in the context of a scheduled or unscheduled event (e.g., routine upgrades or unexpected product failures). Finance module 460 can determine a cost structure for the product.

Data modeler 465 can create the multi-dimensional model by recursively decomposing available products in constituent components. Optimizer 470 may be accessible by inference engine 420 and used to determine a product assembly that satisfies the specified features and functional requirements subject to one or more cost functions. For example, optimizer 470 may minimize the total cost of the provisional assembly of constituent components or maximize a mean time to failure.

GUI generation module 475 can generate one or more GUI screens that allow for interaction with a user of the mobile device or other point of interaction. In at least one embodiment, GUI generation module 475 generates a graphical user interface allowing a user to set preferences, present reports, review inventory, prioritize application functionality, navigate a product catalog, and/or select product constraints. In one embodiment, a graphical user interface that allows a user to create the orderable may be generated by GUI generation module 475.

Figure 5:
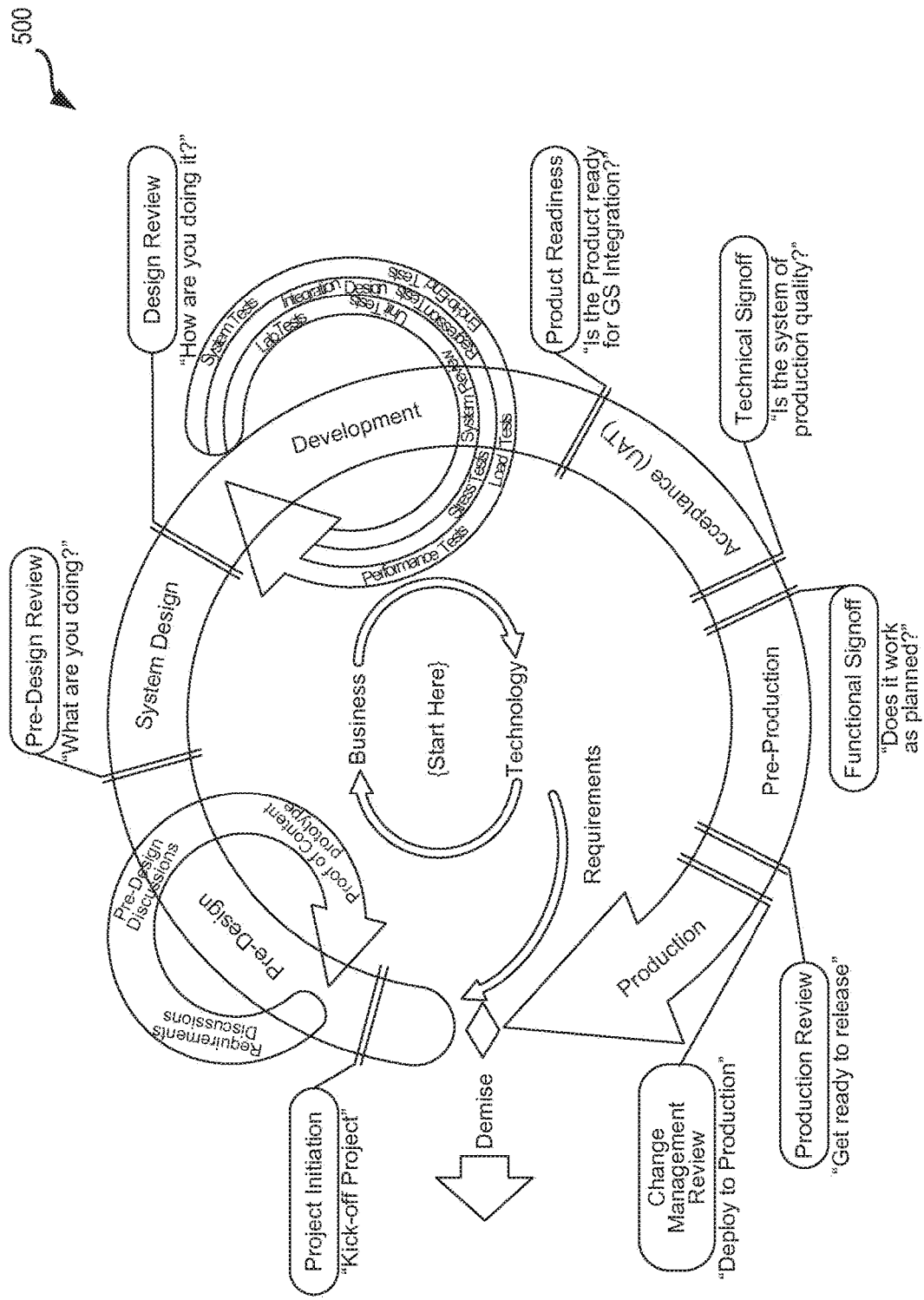
FIG. 5 illustrates an example of a product development life cycle process in accordance with various embodiments of the present technology.

FIG. 5 illustrates an example of a product development life cycle process 500 in accordance with various embodiments of the present technology. As illustrated in FIG. 5, the product development life cycle process can be designed to separate business requirements from technology implementation. A component of product ownership and the discipline of managing orderable consumer demand may be abstracted from the complexity of product assembly. As a result, the product development life cycle process 500 may include a pre-design phase, a system design phase, an acceptance phase, a pre-production phase, and a production phase. The embodiments illustrated in FIG. 5 may have various subphases.

The process depicted in FIG. 5 is an example of a generalized template that could be implemented by product type. For example, a technology application can be an "orderable" product that represents a functional specification as a contract between a technology consumer and provider. The technology applications provider would need to implement a product development lifecycle that leverages the above as a common template, but would need to enrich the development lifecycle with the nuances of software development as a part of their products provisionable assembly.

Figure 6:
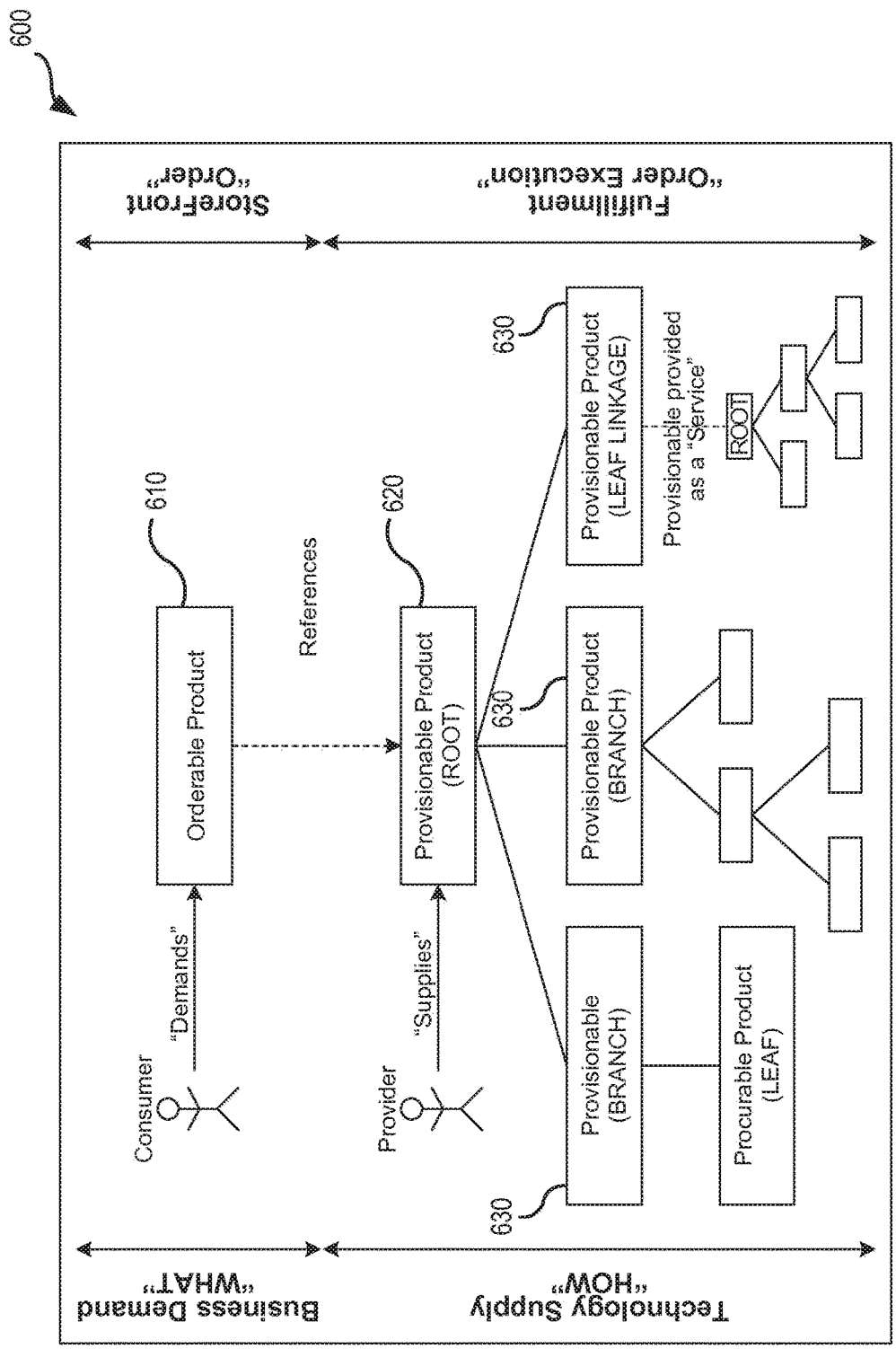
FIG. 6 illustrates a provisionable product tree in accordance with some embodiments of the present technology.

FIG. 6 illustrates a provisionable product tree 600 in accordance with some embodiments of the present technology. Product supply and demand is most commonly represented by an economic model of quantity and price. The model concludes that in a competitive market, the unit price of a product will stabilize at a point of economic equilibrium when the quantity of consumer demand balances with the quantity supplied by providers. This model remains relevant to the economics of the enterprise business of technology. However, it is much more relevant when the model is enriched with a definition of "product" as a complex structure representing the following: 1) the intent of enterprise consumer demand and its relationship to the assembly structure of supply from the enterprise provider; and 2) the assembly of supply within the enterprise and its demand on supply from external technology providers.

A technology demand side product can be expressed by the features and functions it provides to the intended consumer. This representation of consumer intent can serve as a contract between the product provider and consumer that is distinct from the provider's product assembly and the enterprise's fulfillment methodology. Consumers may be able to "order" technology products from a well-defined enterprise technology storefront (e.g., storefront 120 in FIG. 1) that optimizes the consumer's ability to locate the right technology "orderable" product representing their functional specification of intent.

According to various embodiments, a technology "orderable" product 610 can include a formal functional specification of what the product can deliver to the consumer. Consumers may be able to use their functional intent to navigate through an orderable taxonomy of products in a well-defined product catalog. Any particular orderable product may require the consumer to make explicit choices from available options constrained by the product's intent. Such options would need to be specified or "filled in" as part of the "orderable" product's order entry process.

In some embodiments, an enterprise product provider may be able to satisfy their consumer demand by leveraging the most commercially effective technology available at a point in time. Over time, the provider may be able to evolve their implementation to keep pace with the rate of technology innovation around them as well as the functional evolution of their consumer base as it becomes more sophisticated.

The demand side "orderable" product model can deliver a functional specification as a contract between the consumer and provider. This contract may be associated with a supply side product structure called the "provisionable" product. The provisionable product can include the product the technology provider needs to assemble to meet their consumer's orderable demand. The composition of the "provisionable" product can be modeled as a tree structure illustrated in FIG. 6.

The ROOT provisionable product 620 is the product a "primary" technology provider or product owner needs to assemble to satisfy their client's orderable product demand. The subordinate nodes in the underlying compositional tree represent the products the primary provider requires to implement their assembly. BRANCH nodes 630 represent provisionable product components and leaf nodes can represent either 1) procurable product components that need to be acquired from external providers that are subjected to an enterprise procurement process; and/or 2) provisionable product components that rely on a disparate ROOT provisionable product implementation.

Each level in the tree represents a recursive supply and demand relationship between internal provisionable providers and/or external procurable providers required to provide product to participate in the overall assembly. Primary providers own the ROOT provisionable products lifecycle and are responsible for managing the inherent recursive dependencies between their consumers and other providers. A well-defined and properly executed product development lifecycle process that allows a ROOT provider to manage their relationship with other suppliers independently to their orderable relationship with their consumers is a useful component of properly executed product management as illustrated in FIG. 5.

A provisionable product node that has a self-contained assembly tree is an inclusive subassembly and is represented as a branch node in its parents ROOT assembly tree. A provisionable product leaf node does not have a self-contained assembly tree and represents a proxy for demand from a disparate ROOT assembly tree. The provisionable leaf nodes are all dependent on disparate ROOT provisionable assemblies. Their implementation can be thought of as a "service" extension to the existing feature, function and capacity from disparate "utilities" or "applications" that have been implemented as root provisionable assemblies in their own right.

The ability to compose provisionable products as a blend of inclusive subassemblies and aggregations of disparate assemblies is a feature of the enterprise technology product model that facilitates an anatomical view of technology products and their usage across the organization. Such an anatomical representation combined with technology inventory management may be present in various embodiments to effectively provide technology provisioning, operations and the bill of technology presented to the technology consumer.

Figure 7:
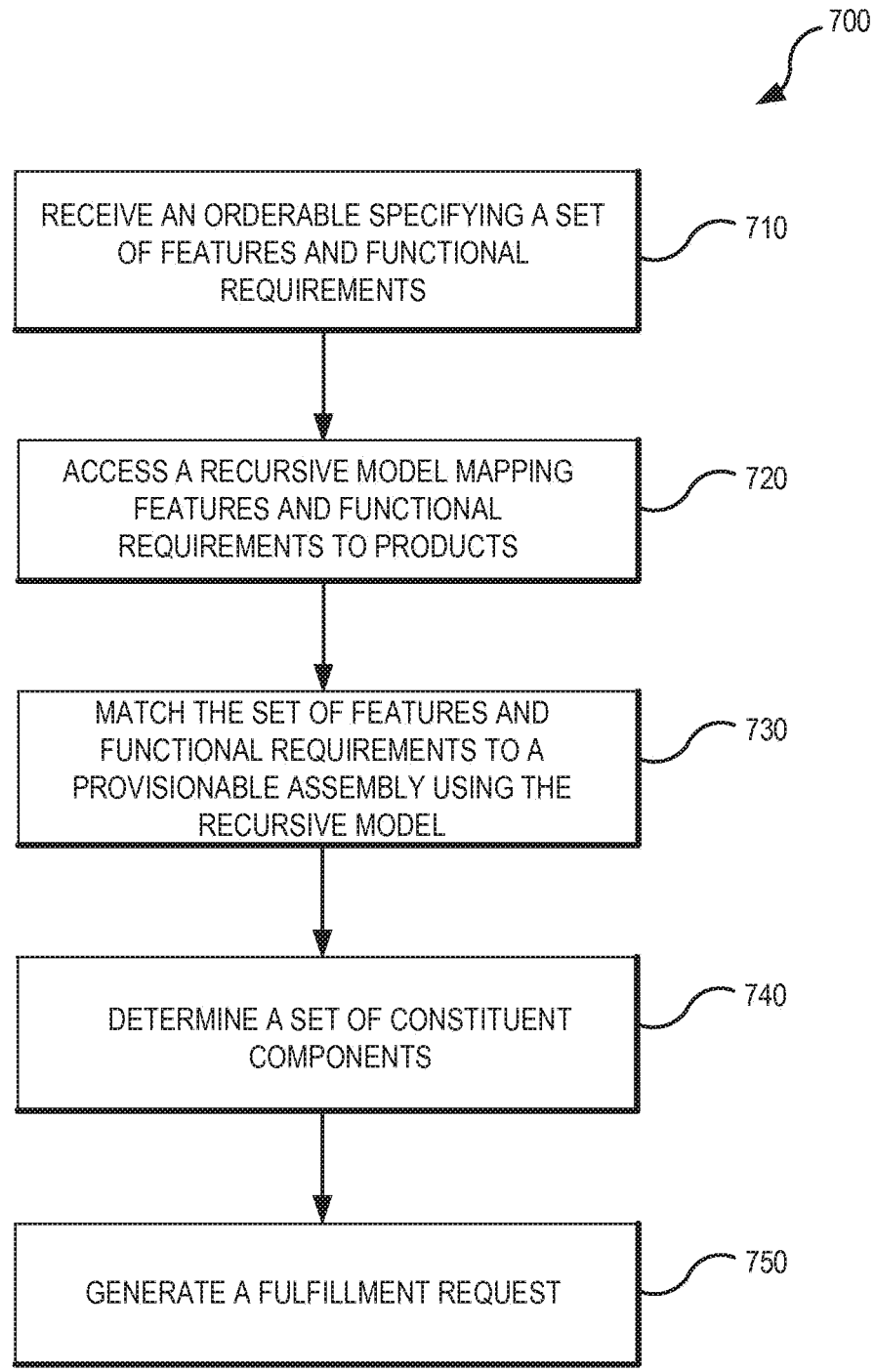
FIG. 7 is a flowchart illustrating a set of operations for provisioning a product in accordance with one or more embodiments of the present technology.

FIG. 7 is a flowchart illustrating a set of operations 700 for provisioning a product in accordance with one or more embodiments of the present technology. The operations illustrated in FIG. 7 may be performed, for example, by one or more modules or other system components of provisioning system 125. Receiving operation 710 receives an orderable specifying a set of features and functional requirements (e.g., established using the semantically normalized model). Accessing operation 720 accesses a recursive model that maps the features and functional requirements to provisionable products offered by an enterprise, which products may span different technology platforms and operating systems. Matching operation 730 uses the recursive model to match the set of features and functional requirements to a provisionable assembly that can be currently built.

Determination operation 740 determines a set of constituent components needed to build the provisionable assembly. The set of constituent components may be other assemblies (i.e., subassemblies), services, applications, etc. In some cases, determination operation 740 may determine the availability of the constituent components using inventory module 450. The availability may include availability of technicians and/or components needed to install or assemble the provisionable assembly. If determination operation 740 determines that some of the components are not available (or not available within the needed time frame), determination operation may generate one or more notifications providing a summary and/or details of the situation. In some embodiments, one or more alternative substitutions may be provided with the notifications. Any differences or requirements not met may be highlighted in the notification. Determination operation 740 also may attempt to determine an alternate set of constituent components that will meet the set of features and functional requirements in a timelier manner. Once the set of constituent components has been determined, generation operation 750 generates a fulfillment request. The fulfillment request can identify the requester, a timeframe, a division or project within the company for billing, and/or other information.

Figure 8:
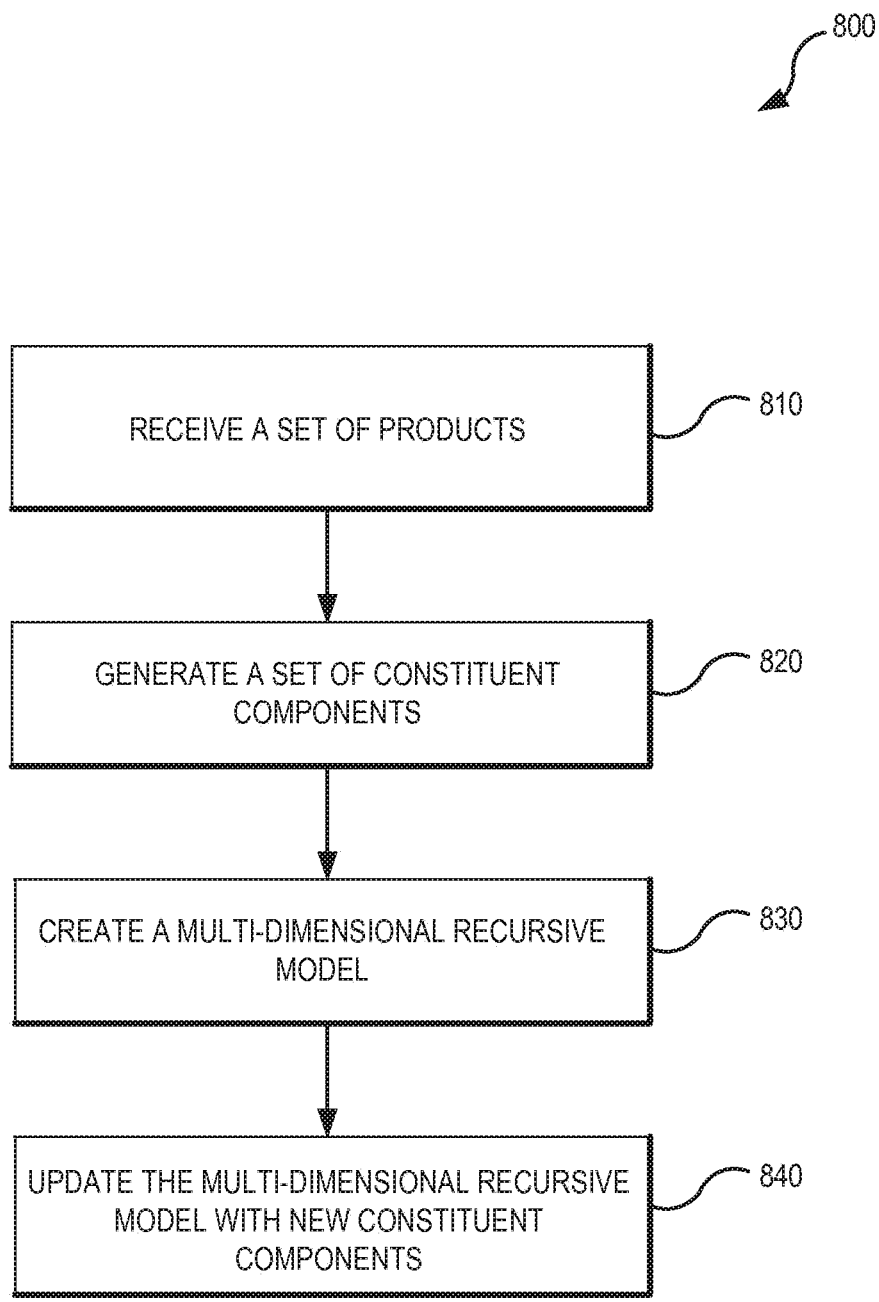
FIG. 8 is a flowchart illustrating a set of operations for creating a recursive model in accordance with various embodiments of the present technology.

FIG. 8 is a flowchart illustrating a set of operations 800 for creating a recursive model in accordance with various embodiments of the present technology. The operations described within this flowchart can be performed, for example, by processor(s) 410, data modeler 465, or other components. Receiving operation 810 receives a set of products that can be selected by users. These products may have various attributes that may be important to a user. These attributes may include product sizes, computational attributes, throughput, software features, and many others.

Generation operation 820 generates sets of constituent components needed to create each of the products. This can be done, for example, using data modeler 465 in FIG. 4. Once the products have been decomposed into the sets of constituent components, creation operation 830 can create a multi-dimensional recursive model which maps a set of features and functional specifications to the products and corresponding set of constituent components. As technology changes over time, various components may become obsolete or no longer available. As these changes occur, update operation 840 updates the multi-dimensional model with the new constituent components.

Figure 9:
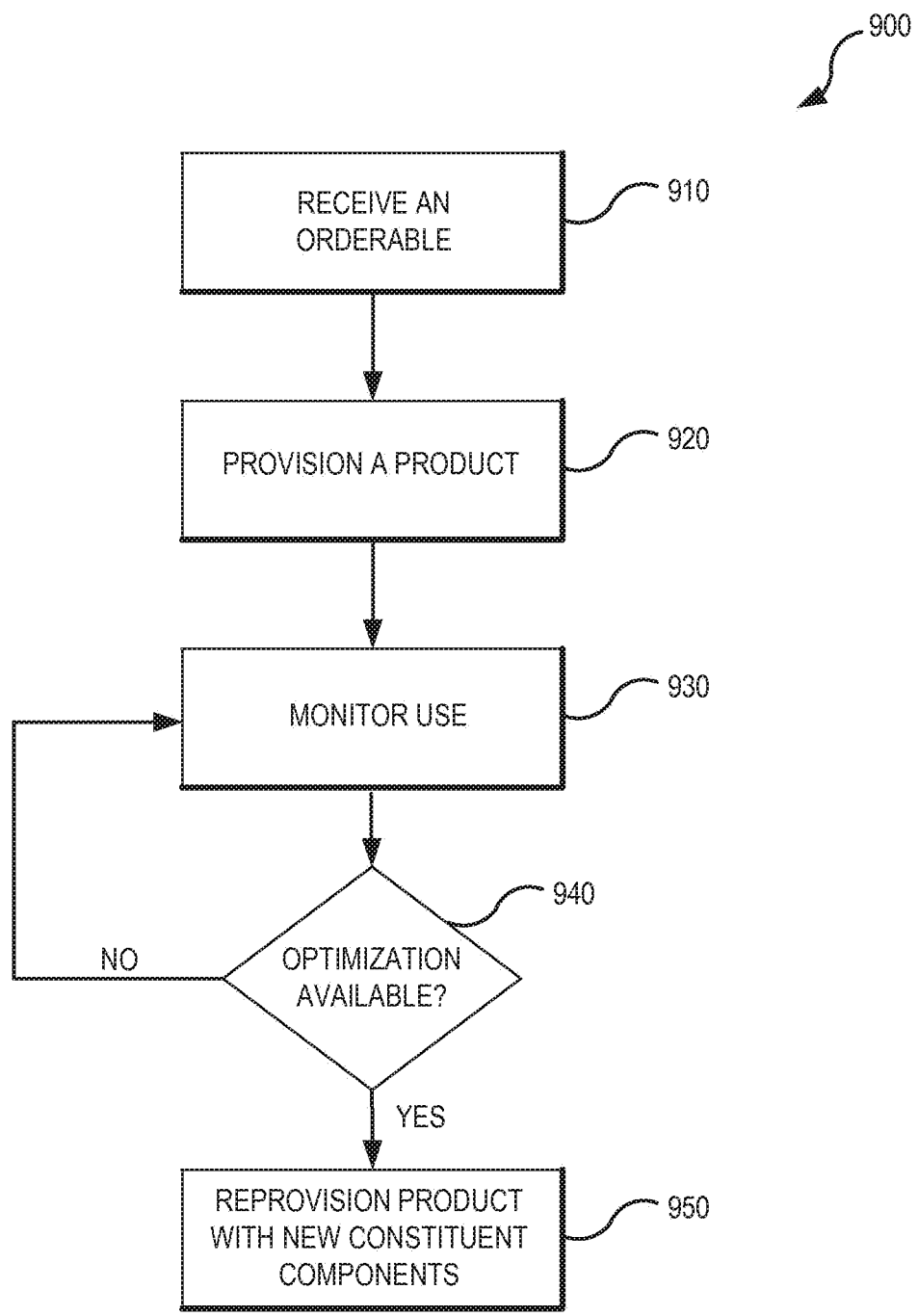
FIG. 9 is a flowchart illustrating a set of operations for provisioning a product in accordance with some embodiments of the present technology.

FIG. 9 is a flowchart illustrating a set of operations 900 for provisioning a product in accordance with some embodiments of the present technology. The operations described within this flowchart can be performed, for example, by processor(s) 410, monitoring module 430, or optimizer 470 in FIG. 4. Receiving operation 910 receives an orderable specifying a set of features and functional requirements desired by a requestor. These features and functional requirements desired by the requestor are used by provisioning operation 920 to generate a request to provision a product. Once the product has been delivered to the requestor, monitoring operation 930 monitors the use, or receives communications regarding the use, of the product. IT may monitor the use of the product to determine if a better product or product configuration may fit the needs of the users better or more cost effectively. If optimization operation 940 determines that no optimization is available, then optimization operation 940 branches to monitoring operation 930. If optimization operation 940 determines that another product would better fit the needs of the users, then optimization operation can branch to reprovisioning operation 950 where the product may be reprovisioned with a new set of constituent components. In some cases, the product can be automatically replaced with the reprovisioned product. In other cases, a user may be notified for approval before replacement.

Figure 10:
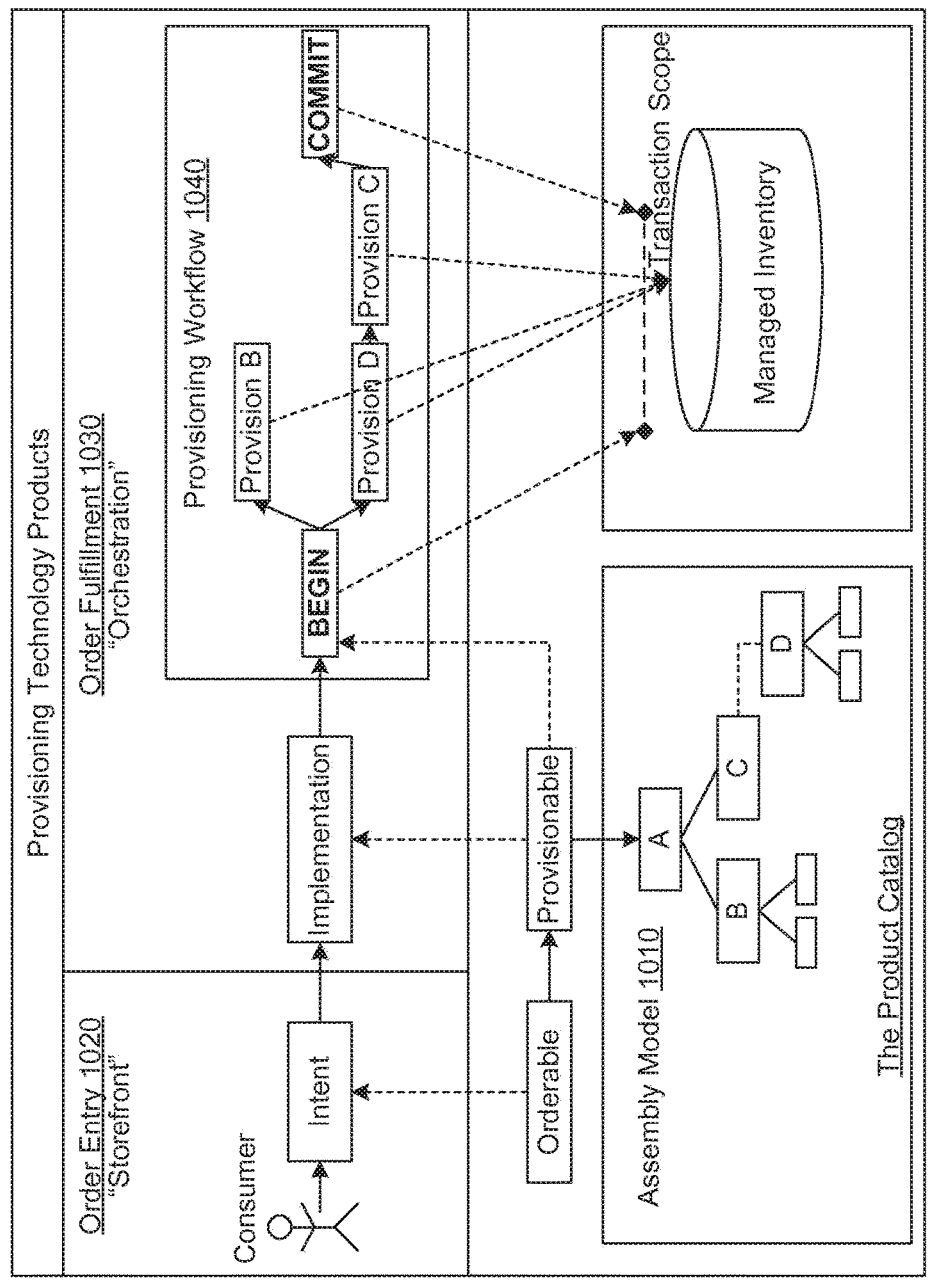
FIG. 10 illustrates a flow from order entry to fulfillment between various system components in accordance with one or more embodiments of the present technology.

FIG. 10 illustrates a flow from order entry to fulfillment between various system components in accordance with one or more embodiments of the present technology. In some embodiments, a technology "Product Catalog" can be considered as the authoritative view of enterprise products, composition, and behavior. An implemented catalog solution may be a useful component of the broader system's architecture that allows for effective implementation of technology provisioning, operations and financial management.

Technology provisioning manages the creation, movement, failure, and demise of technology assets within the enterprise. The resulting technology product inventory will represent instances of technology procurable products participating in provisionable product assemblies providing technology capacity and capability to explicit orderable product consumers. The relationship between assets is governed by the provisionable product ROOT assembly model 1010. In some embodiments, enterprise provisioning can be decomposed into two high-level functions, both of which can be product driven.

During order entry 1020, products from the technology product catalog can be accessible to potential consumers via a technology storefront. The storefront may support textual search by name or attribute and dimensional search by intent. After locating the appropriate orderable product, the storefront can enable the consumer to submit a structured order and then track the progress of the fulfillment workflow to completion (i.e., orderable product delivery).

Order fulfillment 1030 executes the provisioning workflow 1040 required to orchestrate the fulfillment of a requested order. The product catalog links the requested orderable product to a ROOT provisionable product and its associated assembly tree. The catalog can maintain a reference from the assembly tree to an appropriate representation of the required provisioning workflow. The provisioning system can use the reference to acquire and then execute the workflow. Execution needs to be orchestrated as an ACID ("Atomicity, Consistency, Isolation, and Durability") transaction responsible for coordinating the creation or destruction of inventory, increase or decrease of capacity and any required bindings to the consumer.

Enterprise technology order fulfillment flows can be further decomposed into two functional categories: 1) supply side fulfillment; and 2) demand side fulfillment. Supply side fulfillment flows can be used to orchestrate the creation of products by providers to meet projected consumer demand. The supply side fulfillment flows represent the provisioning workflow a provider could implement to maintain inventory and capacity ahead of their consumer demand. These flows may be complex in some situations as they represent the actual creation of technology capability and capacity. For example, the supply side creation of compute capacity and capability in an enterprise data center is a complex provisionable assembly of network, storage and platform subassemblies. Provisioning can be a complex orchestration across multiple internal and external providers.

The demand side fulfillment flows can be used to orchestrate the allocation of technology capability and capacity to the consumer to meet their orderable demand. Generally, technology demand side fulfillment can draw down on existing technology capability and capacity. For example, the consumer facing orderable products for computing resources represents the enterprise applications developers' demand for a technology runtime. Application developers would "order" such products as part of building a technology assembly representing the deployment requirements to run an instance of their application.

A provider's ability to simplify their consumers' demand side interactions is directly dependent on their ability to proactively manage their supply side. Demand forecasting, capacity management and the balance of the cost of carrying excess inventory are key drivers to properly managing the technology supply curve ahead of the consumer demand curve.

Figure 11:
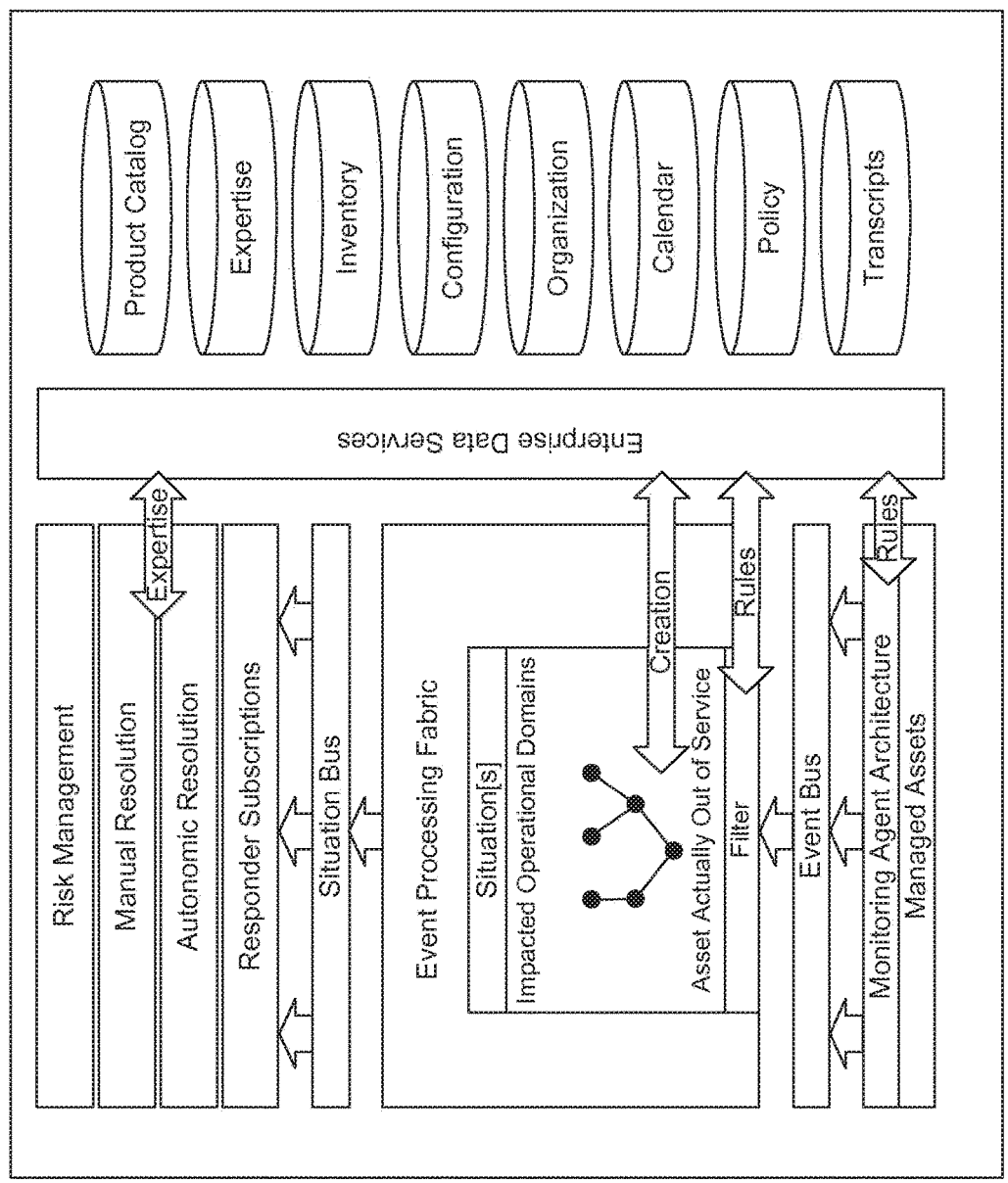
FIG. 11 illustrates an example of an event processing fabric in accordance with various embodiments of the present technology.

FIG. 11 illustrates an example of an event processing fabric 1100 in accordance with various embodiments of the present technology. In accordance with various embodiments, events may be published via policy driven agents monitoring managed assets ingress into an operational event processing fabric (EPF). The EPF can leverage filtering policies to remove "noise" from the event stream leaving "relevant" events to drive situational analysis. A situation tree may be generated via link analysis leveraging enterprise data services to resolve the product relationships between the asset being monitored and the enterprise business impact. The ROOT node of a situation tree is the actually impacted asset and the leaf nodes are the business processes or applications effectively impacted. EPF publishes the initial situation tree and any subsequent updates as it actively manages it to accurately reflect the granularity of the ingress event stream.

The operational response to a situation is driven via subscription interest in a node[s] in the EPF published situation tree. This paradigm accommodates a range of operational organization constructs including a federated set of operational stake holders that can subscribe to different nodes in the situational tree and triage and resolve them independently.

Figure 12:
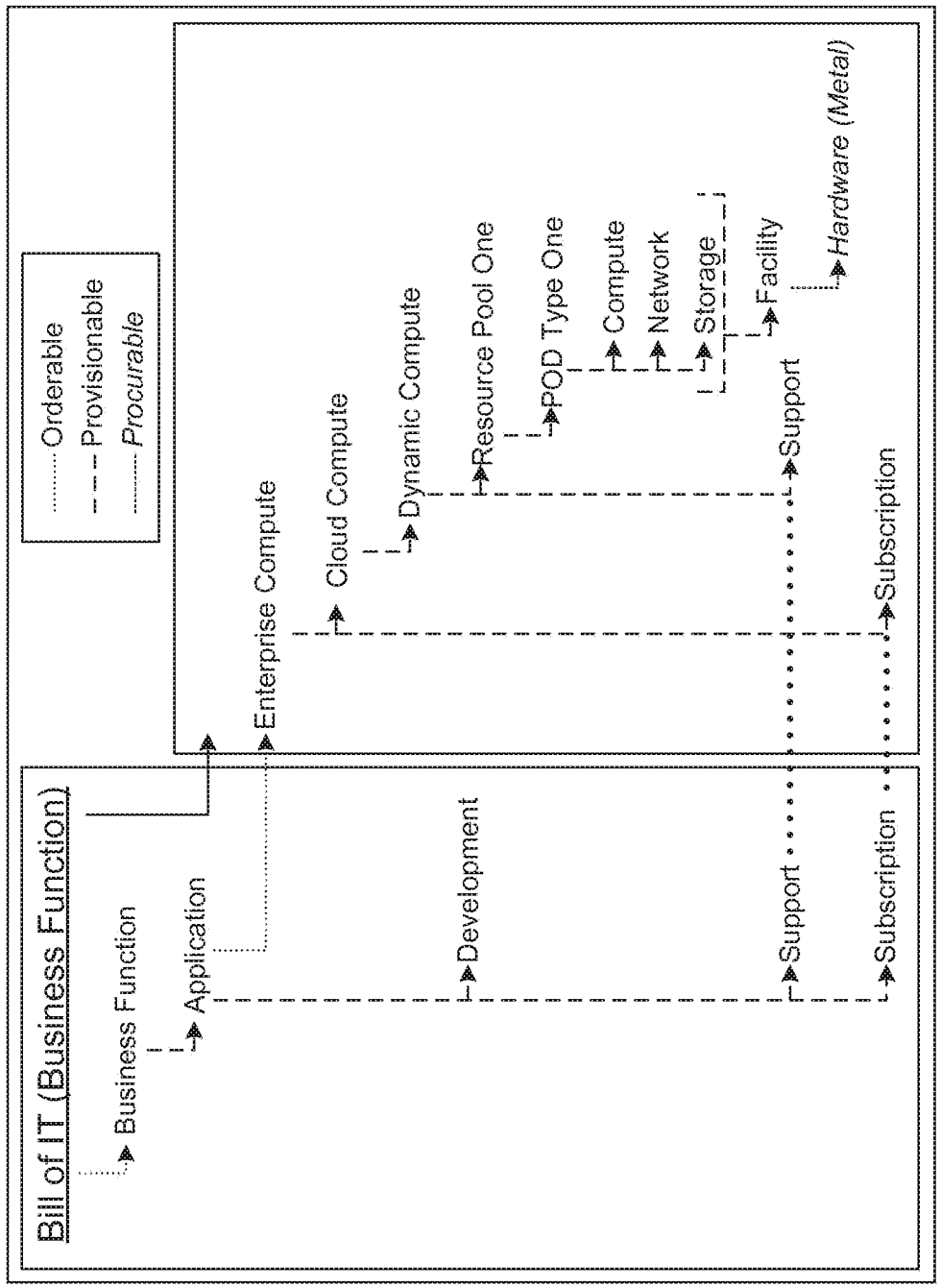
FIG. 12 illustrates technology products driving visibility of technology costs in accordance with some embodiments of the present technology.

FIG. 12 illustrates technology products driving visibility of technology costs in accordance with some embodiments of the present technology. A technology consumer Bill of IT may be considered an enterprise management tool that does one or more of the following: 1) presents the consumer's technology costs in a manner consistent with what they have had provisioned, their usage and operational SLA (service level agreement); and 2) presents enough structural detail to allow consumers to correlate their behavioral model of technology usage with their technology cost model.

To properly achieve these goals, the structure of the consumer's Bill of IT can be driven by the same technology product model that drives consumer ordering, product provisioning and the operation of technology products. The example represented in FIG. 12 is an idealized view of how the structure of a Bill or IT can be generated from the underlying technology product model. The Bill of IT for the business user is the cost of the orderable business function being consumed, which is inclusive of the provider's Bill of IT cost for the application compute environment.

The recursive relationship between consumer and provider may be mapped directly to the demand and supply side representation of the underlying technology product modeling methodology. The cost of the product assembly and associated operational support, and the general subscription cost of technology can all be modeled as financial metadata associated with the product nodes in the relevant provisionable assembly tree structures, with the consumer's orderable cost being the aggregated cost of the associated ROOT provisionable.

Figure 13:
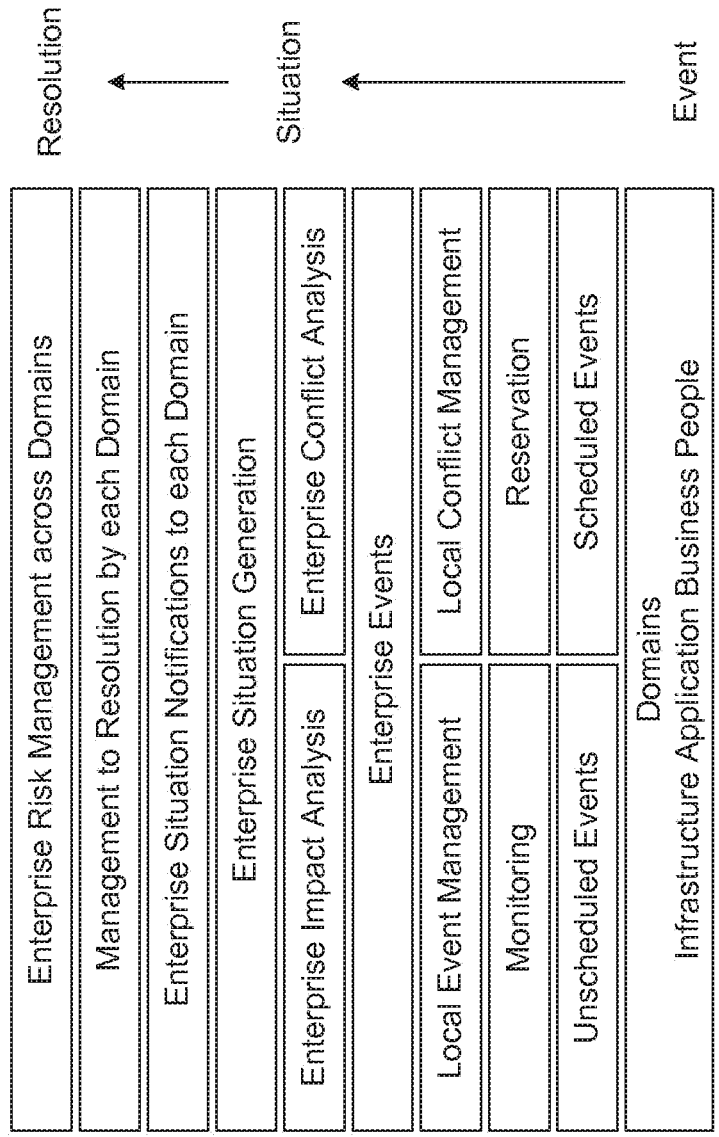
FIG. 13 illustrates examples of products operating as enterprise technology assets in accordance with one or more embodiments of the present technology.

FIG. 13 illustrates examples of products operating as enterprise technology assets in accordance with one or more embodiments of the present technology. The resulting anatomical representation of enterprise technology assets, asset relationships and business usage can be useful for properly managing the asset break/fix/change lifecycle, formerly known as technology operations.

Deployed technology products are enterprise assets that are subjected to operational events resulting in situations that will need to be managed to resolution. The technology enterprise can be logically divided into four coarse grained domains of operational interest: 1) Infrastructure, including deployed products as managed assets; 2) Application, including software executing business processing; 3) Business, including the business environment both within and outside of the enterprise; and 4) People, including the employees of the enterprise.

There are two basic operational event types that drive situational analysis within or across each of these domains: first are the unscheduled events, which include the object being monitored exhibiting abnormal behavior (i.e., something unexpected has happened and is either currently or could in the future impact the object's operational health); second are the scheduled events that, independent of its current or future behavior, an existing object has a defined action explicitly scheduled against it.

Occurrences of either event type can represent an operational situation that needs to be explicitly managed through to resolution. It is also feasible for an occurrence of either event to collaterally impact the other. For example, an unscheduled outage can impact scheduled actions. Conversely, a scheduled action can have unexpected and therefore unscheduled consequences. Efficiency and ownership dictates that the resolution capability of the enterprise be appropriately federated across an organization that is governed by a centralized enterprise risk management function.

As previously discussed, provisioned technology products represent instances of the branch and leaf nodes created by the provisioning fulfillment process. The overall structure of the provisionable product assembly tree from the ROOT node down to inclusive or aggregated provisionable subassemblies may also have been preserved via the appropriate persistence of these relationships as part of an ACID fulfillment transaction. The resulting anatomical view of enterprise deployed technology provides the operational capability to infer the impacted orderable consumers from an issue associated with a managed procurable or provisionable asset.

Exemplary Computer System Overview

Embodiments of the present technology include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 14 is an example of a computer system 1400 with which embodiments of the present technology may be utilized. According to the present example, the computer system includes a bus 1410, at least one processor 1420, at least one communication port 1430, a main memory 1440, a removable storage media 1450, a read only memory 1460, and a mass storage 1470.

Processor(s) 1420 can be any known processor, such as, but not limited to, an Intel® lines of processor(s); AMD® lines of processor(s); or Motorola® lines of processors. Communication port(s) 1430 can be any of an RS-232 port for use with a modem-based dialup connection, a 10/100 Ethernet port, or a Gigabit port using copper or fiber. Communication port(s) 1430 may be chosen depending on a network such as a Local Area Network (LAN), Wide Area Network (WAN), or any network to which the computer system 1400 connects.

Main memory 1440 can be Random Access Memory (RAM) or any other dynamic storage device(s) commonly known in the art. Read only memory 1460 can be any static storage device(s) such as Programmable Read Only Memory (PROM) chips for storing static information such as instructions for processor 1420.

Mass storage 1470 can be used to store information and instructions. For example, hard disks such as the Adaptec® family of SCSI drives, an optical disc, an array of disks such as RAID, such as the Adaptec family of RAID drives, or any other mass storage devices may be used.

Bus 1410 communicatively couples processor(s) 1420 with the other memory, storage and communication blocks. Bus 1410 can be a PCI/PCI-X or SCSI based system bus depending on the storage devices used.

Removable storage media 1450 can be any kind of external hard-drives, floppy drives, IOMEGA® Zip Drives, Compact Disc-Read Only Memory (CD-ROM), Compact Disc-Re-Writable (CD-RW), and/or Digital Video Disk-Read Only Memory (DVD-ROM).

The components described above are meant to exemplify some types of possibilities. In no way should the aforementioned examples limit the scope of the technology, as they are only exemplary embodiments.

In conclusion, the technology of the present app cation provides novel systems, methods and arrangements for technology management. While detailed descriptions of one or more embodiments of the technology have been given above, various alternatives, modifications, and equivalents will be apparent to those skilled in the art without varying from the spirit of the technology. For example, while the embodiments described above refer to particular features, the scope of this technology also includes embodiments having different combinations of features and embodiments that do not include all of the described features.

What is claimed is:

1. A method comprising:
receiving, through a portal, a product ordering request that specifies a set of features and functional requirements desired by a requestor;
accessing a recursive model stored in a memory to match the set of features and functional requirements to a provisionable assembly that satisfies the set of features and functional requirements;
determining, based on the recursive model, a set of constituent components to create the provisionable assembly; and
generating, using at least one processor, a request to provision a product based on the set of constituent components.

2. The method of claim 1, further comprising:
decomposing multiple products each having one or more functional descriptions by representing the functional descriptions with selectable features and functional requirements;
mapping the selectable features and functional requirements into constituent components; and
creating the recursive model based on the constituent components for the multiple products.

3. The method of claim 1, further comprising:
updating the recursive model with new constituent components; and
generating a second request to reprovision the product based on the updated recursive model.

4. The method of claim 1, further comprising:
generating, using the at least one processor, a graphical user interface to present a product catalog configured to be navigated based on selectable features and functional requirements identified by the recursive model.

5. The method of claim 1, wherein the set of constituent components is determined based on a mean time to failure of the provisionable assembly to be created using the set of constituent components.

6. The method of claim 5, wherein the set of constituent components is determined based on minimizing a total cost of the provisionable assembly to be created using the set of constituent components.

7. The method of claim 1, wherein:
the request to provision the product comprises a fulfillment request to build the product; and
the method further comprises predicting an impact the fulfillment request will have on an inventory.

8. A system comprising:
a communication interface configured to receive a product ordering request that specifies a set of features and functional requirements desired by a requestor;
at least one memory configured to store a recursive model; and
at least one processor configured to:
access the recursive model to match the set of features and functional requirements to a provisionable assembly that satisfies the set of features and functional requirements;
determine, based on the recursive model, a set of constituent components to create the provisionable assembly; and
generate a request to provision a product based on the set of constituent components.

9. The system of claim 8, wherein the at least one processor is further configured to:
decompose multiple products each having one or more functional descriptions by representing the functional descriptions with selectable features and functional requirements;
map the selectable features and functional requirements into constituent components; and
create the recursive model based on the constituent components for the multiple products.

10. The system of claim 8, wherein the at least one processor is further configured to:
update the recursive model with new constituent components; and
generate a second request to reprovision the product based on the updated recursive model.

11. The system of claim 8, wherein the at least one processor is further configured to generate a graphical user interface to present a product catalog configured to be navigated based on selectable features and functional requirements identified by the recursive model.

12. The system of claim 8, wherein the at least one processor is configured to determine the set of constituent components based on a mean time to failure of the provisionable assembly to be created using the set of constituent components.

13. The system of claim 12, wherein the at least one processor is configured to determine the set of constituent components based on a total cost of the provisionable assembly to be created using the set of constituent components.

14. The system of claim 8, wherein the provisionable assembly includes at least one procurable product for which data is accessed from at least one vendor.

15. A non-transitory computer-readable storage medium containing instructions that when executed cause one or more processors to:
   receive a product ordering request that specifies a set of features and functional requirements desired by a requestor;
   access a recursive model stored in a memory to match the set of features and functional requirements to a provisionable assembly that satisfies the set of features and functional requirements;
   determine, based on the recursive model, a set of constituent components to create the provisionable assembly; and
   generate a request to provision a product based on the set of constituent components.

16. The non-transitory computer-readable storage medium of claim 15, wherein the instructions when executed further cause the one or more processors to:
   decompose multiple products each having one or more functional descriptions by representing the functional descriptions with selectable features and functional requirements;
   map the selectable features and functional requirements into constituent components; and
   create the recursive model based on the constituent components for the multiple products.

17. The non-transitory computer-readable storage medium of claim 15, wherein the instructions when executed further cause the one or more processors to:
   update the recursive model with new constituent components; and
   generate a second request to reprovision the product based on the updated recursive model.

18. The non-transitory computer-readable storage medium of claim 15, wherein the instructions when executed further cause the one or more processors to generate a graphical user interface to present a product catalog configured to be navigated based on selectable features and functional requirements identified by the recursive model.

19. The non-transitory computer-readable storage medium of claim 15, wherein the set of constituent components is determined based on a mean time to failure of the provisionable assembly to be created using the set of constituent components.

20. The non-transitory computer-readable storage medium of claim 19, wherein the set of constituent components is determined based on minimizing a total cost of the provisionable assembly to be created using the set of constituent components.

* * * * *